July 26, 1932. C. E. CONSTABLE 1,868,727
WEIGHING HOPPER
Filed Oct. 7, 1929
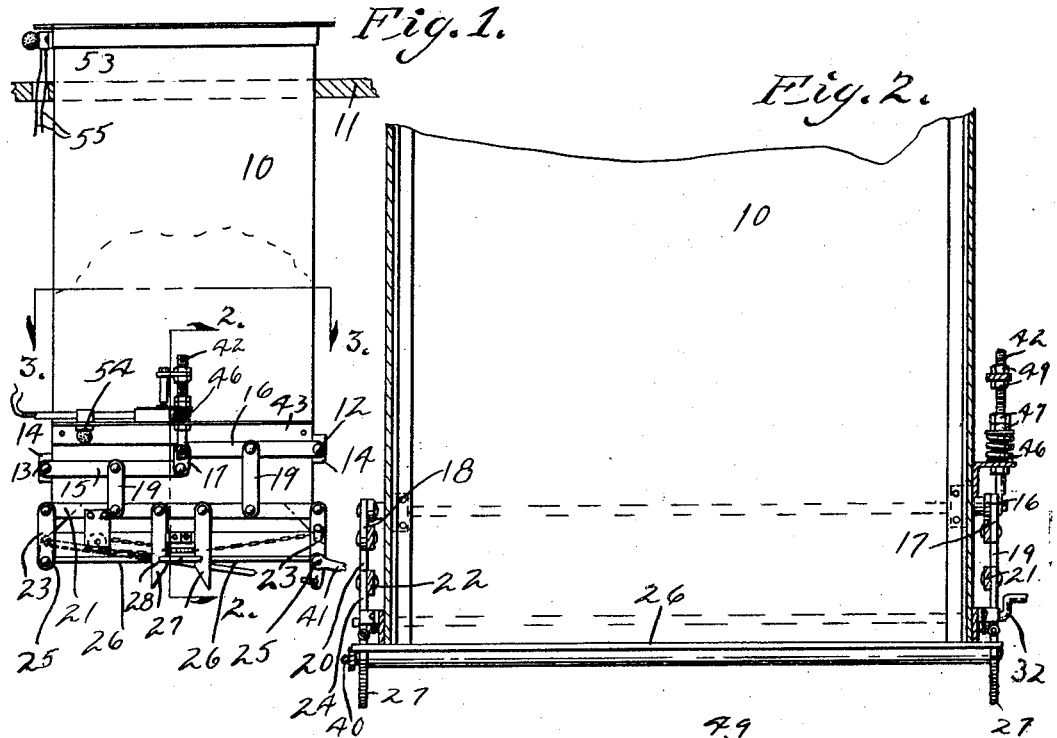

Patented July 26, 1932

1,868,727

UNITED STATES PATENT OFFICE

CHARLES E. CONSTABLE, OF CINCINNATI, OHIO, ASSIGNOR TO THE NATIONAL MARKING MACHINE COMPANY, OF CINCINNATI, OHIO, A CORPORATION OF OHIO

WEIGHING HOPPER

Application filed October 7, 1929. Serial No. 398,063.

The object of my invention is to provide a weighing mechanism of simple, durable and inexpensive construction, which is particularly adapted to be supported by and in operative relation with the lower end of a vertically arranged hopper, whereby laundry articles delivered to said hopper will be automatically weighed in suitable size bundles, and an alarm device operated with a predetermined amount of material has been placed in the hopper; and in connection therewith means whereby the contents of the hopper may be manually dumped into a suitable container.

A further object is to provide in connection with a vertical chute supported in a floor, with one end projecting upwardly above the floor and the other end projecting beneath, means adapted to weigh material placed in the hopper and to signal operators above and below said floor when a predetermined amount of material has been placed in the hopper.

A further object is to provide an improved weighing mechanism particularly adapted to be used in connection with the lower end of a delivery chute, and to operate a signal device when a predetermined amount of material has been placed on the weighing mechanism, and which is comparatively accurate in its operation, even if the material is unevenly loaded on the platform.

A further object is to provide in connection with a weighing mechanism of the type above described, having a signal means for adjusting the means for operating the signal device whereby the load on the platform may be varied before the signal is operated.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my improved device showing the manner in which it is applied to a hopper, and the manner in which the hopper is mounted in the floor.

Figure 2 is an enlarged, detail, sectional view taken on the line 2—2 of Figure 1.

Figure 3 is an enlarged, detail, sectional view taken on the line 3—3 of Figure 1.

Figure 4 is an enlarged side elevation of the lower end of the hopper, showing the moving parts of the weighing mechanism in their loaded position.

The numeral 10 indicates a vertically arranged hopper which is preferably rectangular in cross section, and which is illustrated as being mounted in a floor 11 with its upper end communicating with the room above the floor, and its lower end communicating with a room below the floor. Both ends of the hopper are open, so that laundry articles placed in the upper ends of the hopper from the floor above will pass downwardly into a suitable container below the hopper in the room below.

My improved weighing device comprises shafts 12 and 13, pivotally mounted in suitable bearings 14 from the opposite sides of the chute 10, and a slight distance above its lower end. The shaft 13 is mounted in a plane slightly below the plane in which the shaft 12 is mounted. Each end of the shaft 13 is provided with an arm 15 rigidly secured to the shaft. Each end of the shaft 12 is provided with an arm 16 rigidly secured to the said shaft. The arms 15 and 16 are arranged adjacent to the front and back walls of the chute 10 with their inner ends slightly overlapping in the manner illustrated in Figure 1. The inner ends of the arms 15 and 16 are connected by links 17 and 18.

Pivotally mounted to the central portion of each of the arms 15 and 16 are downwardly extending links 19 and 20. The links 19 are pivotally connected to a horizontal bar 21 and the links 20 are pivotally connected to a horizontal bar 22. Each end of the bar 21 is provided with downwardly extending links 23, while each end of the bar 22 is provided with downwardly extending links 24. The lower ends of each corresponding pair of links 23 and 24 are provided with a shaft 25.

Each of the shafts 25 is secured to the outer edge of a door member 26. The door members 26 are designed to form a square platform and to operate from closed to open positions. The said doors are supported in common horizontal alinement by means of latches 27 engaging outwardly projecting portions 28 from the inner edge of one end of each of the door members. Said latches 27 are connected by a spring 29 which normally retains the latches in operative relation with the lugs 28. Stops 30 are provided for limiting the latches 27 against inward movement when the doors 26 are in an open position. The members 30 are supported by the lower end of the hopper 10.

Said links 23 and 24 are braced to the members 21 and 22 by means of angle plates 31 to hold the lower ends of the links 23 and 24 against lateral movement relative to the members 21 and 22.

Rotatively mounted in one pair of links 23 and 24 is a crank shaft 32 having a crank 33 at one end. A chain 34 has one end connected to the shaft 32, and its opposite end to one of the latches 27. A chain 35 has one of its ends attached to the other latch 27 and designed to pass over a pulley 36 supported on a suitable bracket 37. The other end of the chain 35 is connected to the first said latch 27.

Thus means is provided whereby the latch members 27 may be moved apart by rotating the crank 33, which will cause the chain 34 to be wound on the shaft 32, and the first said latch member 27 moved outwardly, which in turn will cause the chain 35 to be operated over the pulley 36 and the other latch 27 moved in the opposite direction releasing the latches from the lugs 28, and the inner edges of the door members 26 to move downwardly and the material within the chute dumped.

The rear end of one of the shafts 25 is provided with a downwardly extending arm 38 and the rear end of the other shaft 25 is provided with an upwardly extending arm 39. The free ends of the arms 38 and 39 are connected by a rod 40, while the forward end of one of the shafts 25 is provided with a lever 41. The lever 41 together with the arms 38 and 39 and the rod 40 provide means whereby the doors 26 may be easily and quickly moved to a closed position by a downward movement of the free end of the lever 41.

The upper end of the link 17 is provided with an upwardly extending rod 42, the upper end of which is screw threaded and designed to pass through an angle bar 43 secured to one face of the hopper 10. A nut 44 is mounted on the screw threaded portion of the rod 42 and designed to rest against the under surface of the flange 45 of the angle 43. A spring 46 is mounted on the rod 42, the upper end of which rests against nuts 47, thus providing means for yieldably supporting the inner ends of the levers 15 and 16 and for yieldably retaining the doors 26 against the lower end of the hopper 10.

The upper end of the rod 42 is provided with a horizontal bar 48 adjustably secured in position by means of nuts 49. The free end of the bar 48 is provided with a downwardly extending contact member 50 designed to be included in an electric signal circuit. The lower end of the contact 50 is designed to coact with a contact member 51 carried by the switch box 52 when the doors 26 are in their lowered positions of movement, and thereby provide means whereby the signal circuit may be closed.

In the drawing I have illustrated a signal light 53 mounted above the floor 11 and a signal light 54 mounted near the lower end of the hopper. The lights 53 and 54 are in conductors 55 which include the contact members 50 and 51.

Thus it will be seen that I have provided a weighing attachment which may be operatively connected to the lower end of a vertical chute in such manner that articles delivered to the upper end of the chute will fall on the door members 26, which are yieldably supported against the lower end of the chute by the spring 47. The articles may be placed in the chute until the weight is sufficient to overcome the tension of the spring 47, after which the bars 21, together with the doors 26, are moved downwardly and the contacts 50 and 51 closed, causing the signal lights to be lighted, thus signaling the operators both above and below the floor 11 that the desired amount of articles has been placed in the chute. The operator above the floor at that time ceases to place any more articles in the hopper until after the same has been dumped. The operator at the floor below will operate the crank 33 and move the doors 26 to a dumping position, after which they are returned to their normal working position by the lever 41. The frame members 21 together with the doors 26 are elevated and the contact members 50 and 51 separated.

By mounting the levers 15 and 16 to the shafts 12 and 13 and suspending the frame members 21 and the doors 26 from the frame 21, I have provided means whereby the doors 26 will always be maintained in parallel relation with the lower end of the hopper when in a closed position and when in either an elevated or lowered position of movement, so that the device is comparatively accurate in its operation regardless of the position of the material within the hopper on said doors. That is, the entire bundle may be supported in one corner of the hopper without affecting the weighing mechanism.

Thus it will be seen that I have provided a weighing mechanism of simple, durable and inexpensive construction which may be easily and quickly applied to the delivery end of a hopper, and when so applied, articles delivered thereto may be accurately weighed and a signal device automatically operated when a predetermined weight of the material has been placed in the hopper. Means is provided whereby the size of the bundles may be varied by adjusting the nuts 47. The nuts 49 provide means for adjusting the contacts.

I claim as my invention:

1. In combination, a hopper having its upper and lower ends open, doors for closing the lower end of said hopper, means yieldably supporting the doors to permit them to move toward and from the bottom end of said hopper when in a closed position, an electric switch device, and means actuated by the downward and upward movement of said doors for closing and opening said switch.

2. In combination, a hopper having its lower end open, doors for closing the lower end of said hopper, said doors being pivoted to swing from a closed position to an open position, means for yieldably supporting the doors against the lower end of said hopper when in a closed position, an electric switch, adjustable means actuated by the downward and upward movement of said doors for closing and opening said switch, and means carried by the yieldable supporting means for latching the doors in a closed position.

3. In combination, a hopper having its lower end open, a door support adapted to be elevated and lowered, yieldable means for retaining the door support in an elevated position, a door pivotally mounted in said support adapted when in its normal elevated position to close the bottom of said hopper, means for pivotally mounting said door to said support to permit it to swing to an open position for discharging material from said hopper, means for latching said door in its closed position, and hand actuated means for releasing said latch.

4. In combination, a hopper having its lower end open, a door support adapted to be elevated and lowered, yieldable means for retaining the door support in an elevated position, a door pivotally mounted in said support adapted when in its normal elevated position to close the bottom of said hopper, means for pivotally mounting said door to said support to permit it to swing to an open position for discharging material from said hopper, means for latching said door in its closed position, hand actuated means for releasing said latch, and means for moving said door to its closed position.

5. In combination, a hopper having its lower end open, a door support adapted to be elevated and lowered, yieldable means for retaining the door support in an elevated position, a door pivotally mounted in said support adapted when in its normal elevated position to close the bottom of said hopper, means for pivotally mounting said door to said support to permit it to swing to an open position for discharging material from said hopper, means for latching said door in its closed position, hand actuated means for releasing said latch, and means actuated by the movable door supporting member for closing an electric circuit.

6. In combination, a vertical chute having its lower end open, a door supporting frame adjacent to the lower end of said chute adapted to move up and down, yieldable means for retaining said frame in an elevated position and to operate in parallelism with the bottom of said hopper, a pair of doors pivotally mounted in said door supporting frame adapted to be normally supported in a common plane and in substantially parallel relation with the bottom of said hopper and to swing from said closed position to an open position to discharge material from within said hopper, corresponding ends of said doors being provided with lugs, a latch for supporting each of said lugs, means for yieldably retaining said latches in a closed position, means for simultaneously operating both of said latches to an open position, and means actuated by the up and down movement of said door supporting frame for actuating a signal device.

7. In combination, a vertical hopper comprising parallel side and end members, said hopper having its bottom end open, a shaft rotatively mounted adjacent to each of the end members of said hopper, each shaft having each end provided with a fixed and inwardly extending arm, links for connecting the inner ends of the corresponding arms, a link pivotally connected to and depending from each of said arms, a horizontal bar supported by the lower end of each corresponding pair of links, a vertical screw threaded rod pivotally connected to one pair of inwardly extending arms, yieldable means for supporting said rod in said arms and said bars in an elevated position, means actuated by the up and down movement of the last said rod for operating a signal device, a pair of doors operatively connected to said bars adapted to move from a closed position in a common horizontal plane to a vertical open position, means carried by one of said bars for latching the doors in their closed position, means for yieldably retaining said latch devices in a closed position, means for simultaneously moving said latch devices to an open position, and means for moving said doors to a closed position.

8. In combination, a vertical hopper comprising parallel side and end members, said hopper having its bottom end open, a shaft rotatively mounted adjacent to each of the end members of said hopper, each shaft having each end provided with a fixed and inwardly extending arm, links for connecting the inner ends of the corresponding arms, a link pivotally connected to and depending from each of said arms, a horizontal bar supported by the lower end of each corresponding pair of links, a vertical screw threaded rod pivotally connected to one pair of inwardly extending arms, yieldable means for supporting said rod in said arms and said bars in an elevated position, means actuated by the up and down movement of the last said rod for operating a signal device, a pair of doors operatively connected to said bars adapted to move from a closed position in a common horizontal plane to a vertical open position, means carried by one of said bars for latching the doors in their closed position, means for yieldably retaining said latch devices in a closed position, means for simultaneously moving said latch devices to an open position, said means comprising a crank shaft, a chain connecting said crank shaft with one of said latch devices, a pulley, and a second chain connected to the last said latch device extending over said pulley and connected with the other latch device.

9. In combination, a vertical hopper comprising parallel side and end members, said hopper having its bottom end open, a shaft rotatively mounted adjacent to each of the end members of said hopper, each shaft having each end provided with a fixed and inwardly extending arm, links for connecting the inner ends of the corresponding arms, a link pivotally connected to and depending from each of said arms, a horizontal bar supported by the lower end of each corresponding pair of links, a vertical screw threaded rod pivotally connected to one pair of inwardly extending arms, yieldable means for supporting said rod in said arms and said bars in an elevated position, means actuated by the up and down movement of the last said rod for operating a signal device, a pair of doors operatively connected to said bars adapted to move from a closed position in a common horizontal plane to a vertical open position, means carried by one of said bars for latching the doors in their closed position, means for yieldably retaining said latch devices in a closed position, means for simultaneously moving said latch devices to an open position, said means comprising a crank shaft, a chain connecting said crank shaft with one of said latch devices, a pulley, and a second chain connected to the last said latch device extending over said pulley and connected with the other latch device, and means for manually closing said doors.

10. In combination, a vertical hopper supported with one end above a floor and the other end terminating below the floor, a signal device above and below said floor, means for closing the lower end of said hopper, means for supporting said closing means whereby the closing means may be moved toward or from the open end of said hopper, means for yieldably retaining the closing means at its upper limit of movement whereby the weight of the material placed thereon will cause said closing means to move downwardly, and means actuated by the downward movement of said closing means for operating said signal devices.

11. In combination, a hopper adapted to have one end terminating above a floor and the other end below the floor, a signal device near each end of said hopper, a yieldably supported frame, means carried by said frame for opening and closing the lower end of said hopper, and means actuated by the downward movement of said frame caused by the weight on said closing means for actuating said signals.

Des Moines, Iowa, Sept. 12, 1929.

CHARLES E. CONSTABLE.